(12) United States Patent
Martin et al.

(10) Patent No.: US 7,565,014 B2
(45) Date of Patent: Jul. 21, 2009

(54) METHOD FOR AUTOMATICALLY DEFINING REGIONS OF INTEREST FOR MATCHING AND VISUALIZING FORENSIC IMAGES

(75) Inventors: Bruno Martin, Montreal (CA); François Godbout, Beauport (CA)

(73) Assignee: Forensic Technology Wai Inc., Montreal, Quebec (CA)

( * ) Notice: Subject to any disclaimer, the term of this patent is extended or adjusted under 35 U.S.C. 154(b) by 990 days.

(21) Appl. No.: 11/140,090

(22) Filed: May 31, 2005

(65) Prior Publication Data

US 2005/0207650 A1    Sep. 22, 2005

Related U.S. Application Data

(63) Continuation of application No. PCT/CA03/01894, filed on Dec. 3, 2003.

(51) Int. Cl.
*G06K 9/46* (2006.01)
(52) U.S. Cl. .................. 382/190; 382/224; 382/171
(58) Field of Classification Search ............... 382/190, 382/171, 224
See application file for complete search history.

(56) References Cited

U.S. PATENT DOCUMENTS

2004/0001632 A1* 1/2004 Adachi ................ 382/224
2005/0147170 A1* 7/2005 Zhang et al. ........... 375/240.16

OTHER PUBLICATIONS

Jie Zhou et Al, Algorithm of automatic cartridge identification, vol. 40, No. 12, Dec. 2001 XP002299340.
F. Puente Leon, Kapitel 4, 1999, pp. 55-98 XP002299341.
L.J. Van Vliet and P.W. Verbeek, Estimators for Orientation and Anisotropy in Digitized Images, May 1995, pp. 442-450 XP002299342.
Jurgen Beyerer, Kapitel 5, Analyse Von Riefentexturen, Fortschritt-Berichte VDI Reihe 1994, pp. 30-101 XP002303398.
Heizmann M. et Al. Model-based analysis of striation patters in forensic science, vol. 4232, 2001, pp. 533-544, XP002299343.
Gardner G Y Ed, Jackson J S Institute of Electrical and Electronics Engineers, Computer Identification of Bullets, 1977, pp. 149-166 XP000565287.
Beyerer J et al. Adaptive separation of random lines and background, vol. 37, Oct. 1998, XP001092895.
Lang S Y T et al, Visual measurement of orientation error for a mobile robot, vol. 49, Dec. 2000, XP002299344.

* cited by examiner

*Primary Examiner*—Matthew C Bella
*Assistant Examiner*—Mike Rahmjoo
(74) *Attorney, Agent, or Firm*—Ogilvy Renault, LLP

(57) ABSTRACT

A method and apparatus for an automated system to extract a high quality signature from an image having areas not relevant for specific identification purposes which can lead to misleading image signatures, the method comprising: identifying at least one region of interest within the image by determining local orientation information at each pixel position in the image, the at least one region of interest comprising elements useful for the specific identification purposes; creating and applying a mask for the image wherein only the at least one region of interest is exposed; extracting a signature for the image taking into account the at least one region of interest exposed by the mask.

34 Claims, 6 Drawing Sheets

METHOD FOR AUTOMATICALLY DEFINING REGIONS OF INTEREST FOR MATCHING AND VISUALIZING FORENSIC IMAGES

RELATED PATENT APPLICATION

This application is a continuation of PCT patent application serial number PCT/CA03/01894 filed Dec. 3, 2003, now pending, which claims priority from U.S. patent application Ser. No. 10/308,095 filed Dec. 3, 2002, now abandoned, the specifications of which are hereby incorporated by reference.

FIELD OF THE INVENTION

The invention relates to detecting regions of interest in images. More specifically, it relates to automatically detecting lined regions contained inside forensic digital images.

BACKGROUND OF THE INVENTION

The traditional way of comparing ballistic evidences such as cartridges and bullets is for a human specialist to manually examine the reference and all the candidates with a comparison microscope. This is a very tedious and time-consuming process that makes matches less likely. Recently, a few systems have been invented to automatically perform ballistic image comparisons. For example, the Russian Condor system (Russian patents No. 2130628, No. 2155378, and No. 2174251), the German GE/2 system (inventors M. Heizmann and F. Puente Leon), the Forensic Expert Assistance System Abal Labview (FEASABLE) system from ABAL in Belgium. These systems were created to speed up the work of firearm examiners whose numbers are few. The common principle behind these systems is the acquisition of images (2D or 3D) from evidence, the extraction of signatures, and the comparison of these signatures, often performed by some kind of cross-correlation. Once a human operator has acquired the reference image, the rest of this process can be done in a matter of hours even for large databases of previously acquired images.

One of the critical parts of this operation is the creation of "good" signatures from the acquired images. This is particularly true of non-pristine bullet images, which are very noisy and contain a lot of random marks that are not relevant to the matching operation. These random marks are consciously ignored by a firearm examiner during his visual exam but can seriously compromise the performance of an automated system. To solve this problem, certain systems, such as FEASABLE, ask the user to manually draw the contour of the regions relevant to the matching step over the original reference image. These regions then contain mostly lines that share the same orientation and of course excludes parts of the image that do not contain lines.

The selected regions alone are then considered for the creation of signatures. Using only the regions determined by the expert dramatically improves the results of the matching process.

The drawback of this approach is that it takes the knowledge and training of a firearm examiner to select the right regions that will be used for the creation of the signatures. As the number of these experts is much smaller than the number of potential users of the system, this specialized knowledge cannot be expected from the average user.

SUMMARY OF THE INVENTION

Accordingly, an object of the present invention is to extract better quality signatures from images.

Another object of the present invention is to speed up the correlation process for ballistic image comparisons.

Yet another object of the invention is to remove the need to have a firearms examiner participate in the correlation process for ballistic image comparisons.

According to a first broad aspect of the present invention, there is provided a method for an automated system to extract a high quality signature from an image having areas not relevant for specific identification purposes which can lead to misleading image signatures, the method comprising: identifying at least one region of interest within the image by determining local orientation information at each pixel position in the image, the at least one region of interest comprising elements useful for the specific identification purposes; creating and applying a mask for the image wherein only the at least one region of interest is exposed; extracting a signature for the image taking into account the at least one region of interest exposed by the mask.

Preferably, the method also comprises aligning horizontally the elements present in the at least one region of interest. An orientation angle is assigned at each pixel position in the image. A mask is created with the property that a value of zero is then assigned to each pixel position with an orientation angle above a predetermined threshold and is assigned to 1 otherwise.

Alternatively, a dominant orientation angle in the image is determined and a value of zero is assigned to each pixel position with an orientation angle which varies for the dominant angle by more than a predetermined threshold. The mask may be created and applied separately for each dominant angle and a signature is calculated for each image having a separate mask applied.

Also alternatively, the image is separated into a plurality of vertical bands, wherein identifying a region of interest, creating and applying a mask, aligning horizontally elements, and calculating a signature is done for each of the plurality of vertical bands. The plurality of vertical bands can also be based on groupings of similar orientation angles.

According to a second broad aspect of the present invention, there is provided an apparatus for an automated system to extract a high quality signature from an image having areas not relevant for specific identification purposes which can lead to misleading image signatures, the apparatus comprising: storing means to store an image; identifying means for identifying at least one region of interest within said image by determining local orientation information at pixel positions in said image, said at least one region of interest comprising elements useful for said specific identification purposes; masking means for creating and applying a mask for said image wherein only said at least one region of interest is exposed; and extracting means for extracting a signature for said image taking into account said at least one region of interest exposed by said mask.

According to a third broad aspect of the present invention, there is provided a computer data signal embodied in a carrier wave comprising data resulting from a method for an automated system to extract a high quality signature from an image having areas not relevant for specific identification purposes which can lead to misleading image signatures, the method comprising: identifying at least one region of interest within said image by determining local orientation information at pixel positions in said image, said at least one region of interest comprising elements useful for said specific identification purposes; creating and applying a mask for said image wherein only said at least one region of interest is exposed; extracting a signature for said image taking into account said at least one region of interest exposed by said mask.

BRIEF DESCRIPTION OF THE DRAWINGS

These and other features, aspects and advantages of the present invention will become better understood with regard to the following description and accompanying drawings wherein.

DETAILED DESCRIPTION OF THE PREFERRED EMBODIMENT

The most frequently used signatures are 1D signals akin to a vertical profile of the bullet image. Since there is much noise in that kind of image, some care has to be taken before extracting this vertical profile. A simple way to reduce the influence of noise is by averaging the image in the direction of the lines. As the characteristic lines of bullet images are generally tilted by some small angle, typically less than 10 degrees, it is much easier to first align those lines at 0 degree and then simply average along the horizontal direction of the aligned image. Once the image has been rotated so that the characteristic lines are aligned horizontally, signatures can be extracted. This is often done by creating a 1D signal $S(x)$ where the value at position $x=L$ is simply the average gray value of line L of the aligned image. Other statistics could be employed such as the mode or the median.

Figure 1B:
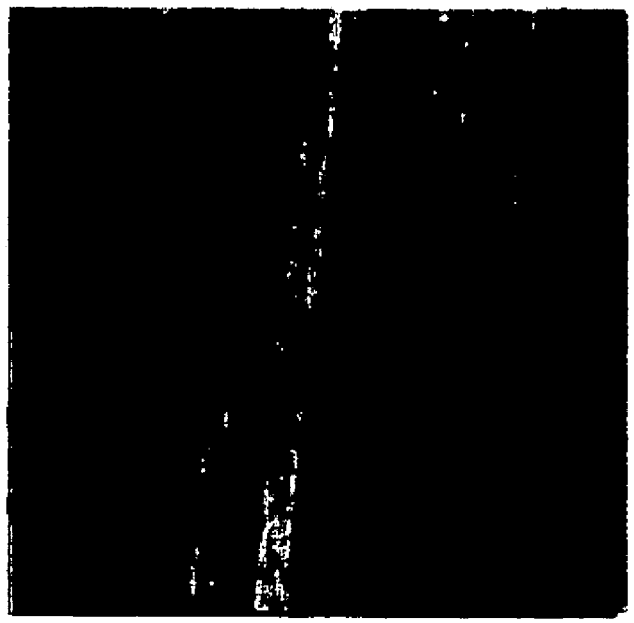
FIG. 1B is a low noise image.
Figure 1A:
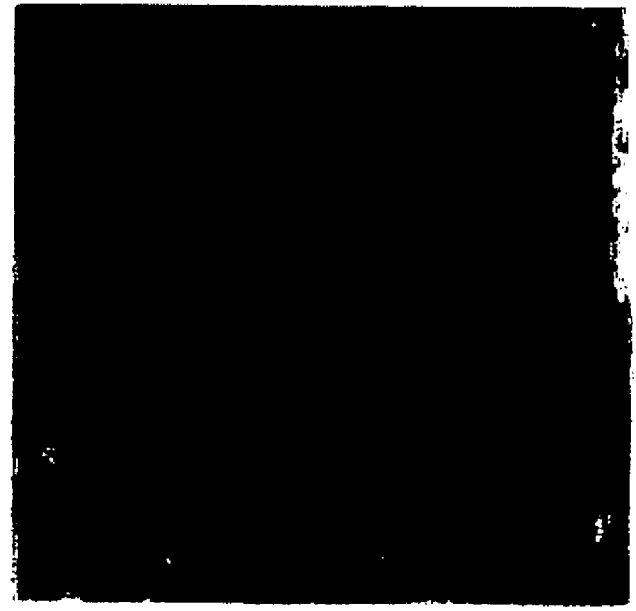
FIG. 1A is a very noisy image.

FIG. 1A is a very noisy image that comprises barely any lines. FIG. 1B is a good quality image with clear lines having a constant orientation. Clearly, a signature based on the image in FIG. 1A is practically useless while a signature based on the image in FIG. 1B is very significant. Based on this principle, it is very important to detect regions having a high signal-to-noise ratio. These regions can then be eliminated from the image and won't impact the signature extracted from the image.

A mask can be created, also called an anisotropic mask, that eliminates the noisy regions before the signature is extracted. The mask is actually an image of the same size as the original image wherein the pixels that correspond to the noisy pixels in the original image are set to zero and the pixels with the clear lines are set to one.

A first module has the principal responsibility of the estimation of the local orientation at each pixel position. This could be accomplished by many different techniques such as texture analysis, Gabor filters, Hough transform or the orientation tensor to name a few. We choose the orientation tensor for its ease of implementation. At the end of this step, we have a real value orientation image named Orilmage that has the same dimension as the original image but where the value associated with each pixel position is the orientation angle comprised between $[-90°, 90°]$.

Based on this orientation image, we can align horizontally the characteristic lines. This can be done globally or locally (by aligning vertical bands of the image individually).

Given the orientation image, the best global alignment angle can easily be found based on the histogram of the orientation image. The simplest choice is just the angle for which the histogram attains its maximum value. We found that in practice, this method gives good results. Other more precise techniques could also be used like finding the best Gaussian distribution fitting the histogram and taking the mean of this Gaussian as the best angle.

As we have observed experimentally, if we split the original image into vertical contiguous bands, some of these bands have an orientation angle that is quite different from the global angle that would have been found by the method described above. This frequently happens in images showing a lot of slippage. For example, the left part of the image could be oriented at 2.5°, the right part at −1.5° while the global orientation could have been 1.0°.

One way to solve this problem is given by the following algorithm. First, split the original image into a few vertical bands (we use anywhere from 4 to 17 depending on the width of the original image). The idea is to compute one histogram for each of these bands by considering only the corresponding pixels in the orientation image. The best angle for each band can then be found by the same strategy as described above. This allows us to align each band with its own dominant angle, minimizing the effect of slippage.

Signatures can then be created for all bands and these signatures will be more precise than if we had created only one signature based on a globally aligned image. Therefore, the chances of matching two bullets fired from the same gun are increased.

Figure 2B:
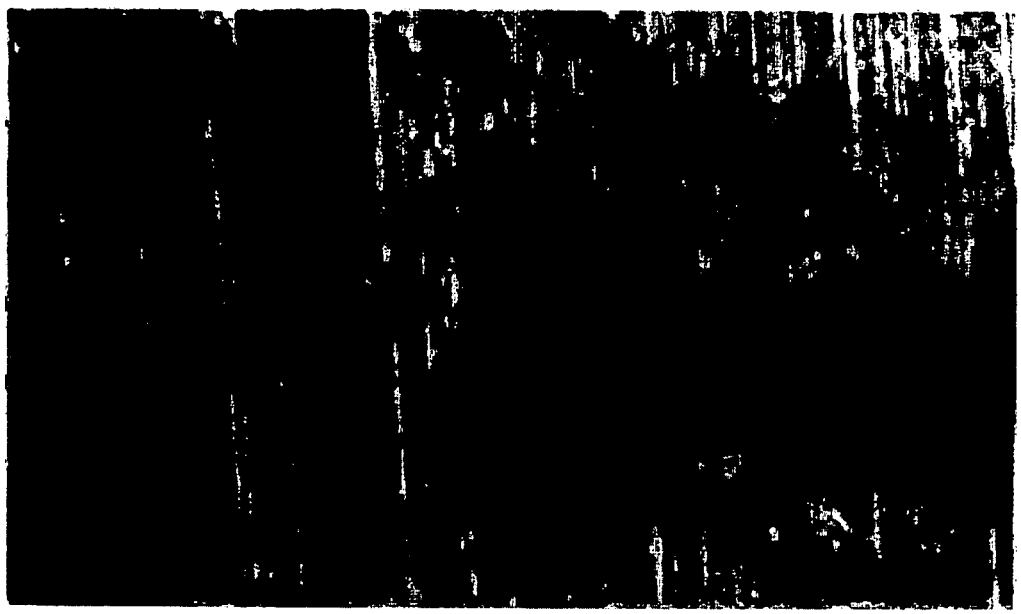
FIG. 2B is the image of FIG. 2A with a mask applied.
Figure 2A:
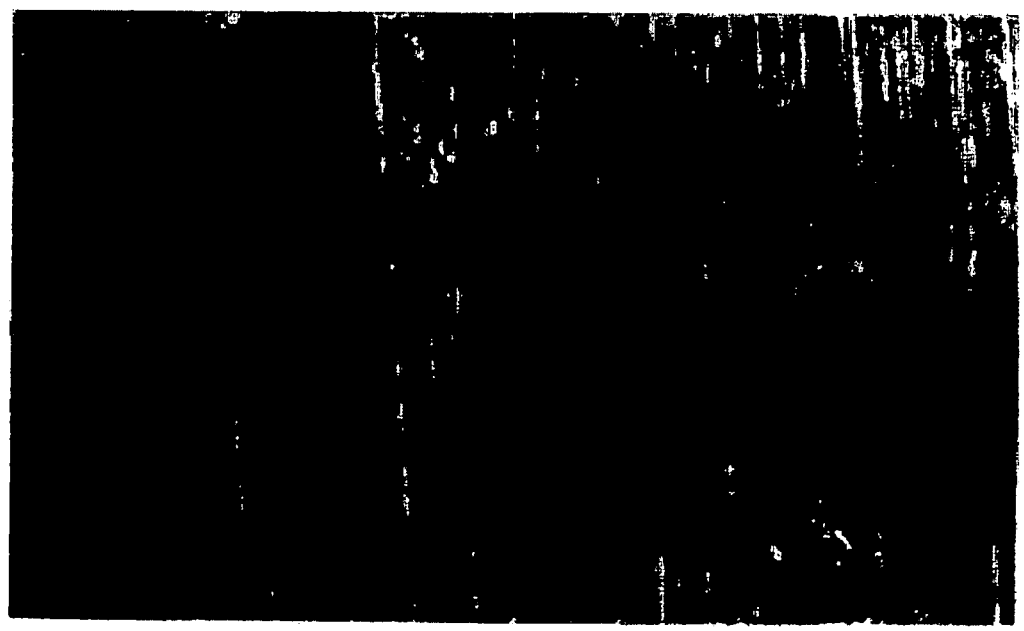
FIG. 2A is an image with a region of high noise.

FIG. 2A is an example of an image with regions that comprise clear lines and regions that are very noisy. FIG. 2B is the same image once the noisy regions have been masked. The pixels in the darkened areas were set to a value of zero in order to be disregarded when the signature is extracted.

Figure 3B:
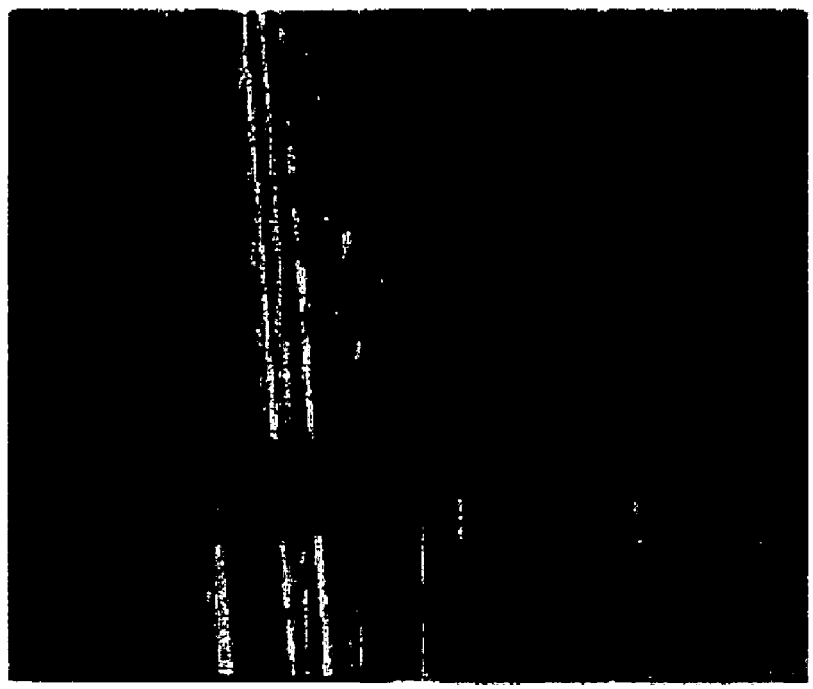
FIG. 3B is the image of FIG. 3A with a mask applied.
Figure 3A:
FIG. 3A is an image with a random striation mark.

Another embodiment of the present invention consists in eliminating random striation marks that are clearly in an opposite direction from the majority of lines in an image. FIG. 3A shows a line intersecting a big part of the other lines and going in an opposite direction. These random marks occur sometimes and are not reproducible. They affect the quality of the image signature necessary for correlation.

Therefore, the present system can detect a dominant orientation of the striation marks and mask regions having orientations that differ from the dominant orientation. In FIG. 3A, the majority of the lines are oriented at 3.5° with respect to the horizontal axis. The random mark is a scratch oriented at −75° with respect to the horizontal axis. The image in FIG. 3B has been masked to eliminate all pixels with an orientation that is not within 3.0° of the dominant orientation. The threshold tolerance, such as 3.0° in this case, can be chosen by the user or can be pre-programmed into the system.

Figure 4C:
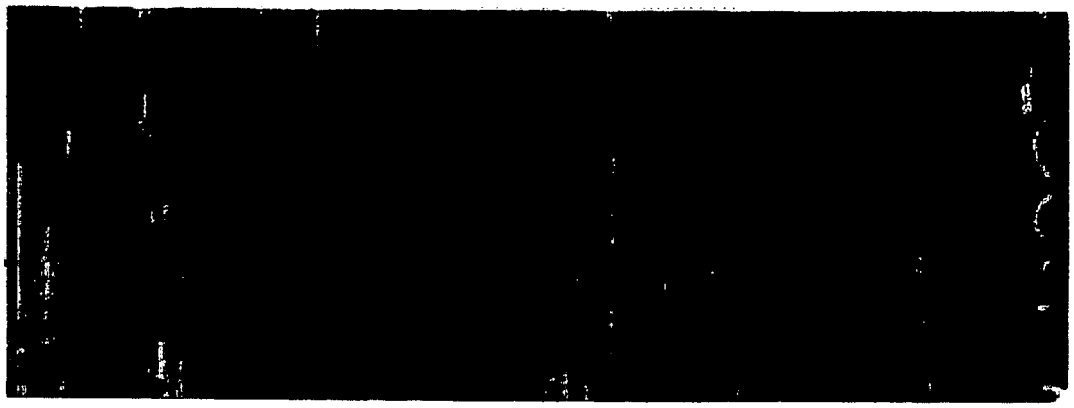
FIG. 4C is the image of FIG. 4B with a second mask applied.
Figure 4B:
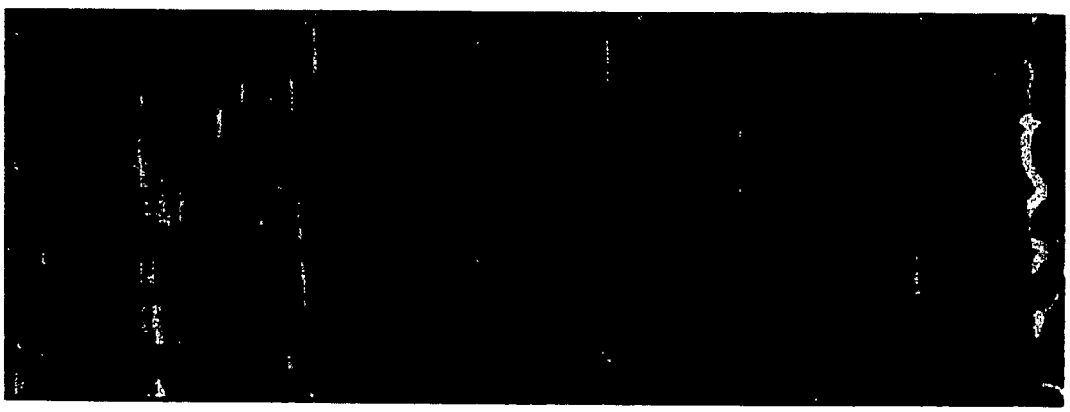
FIG. 4B is the image of FIG. 4A with a first mask applied.
Figure 4A:
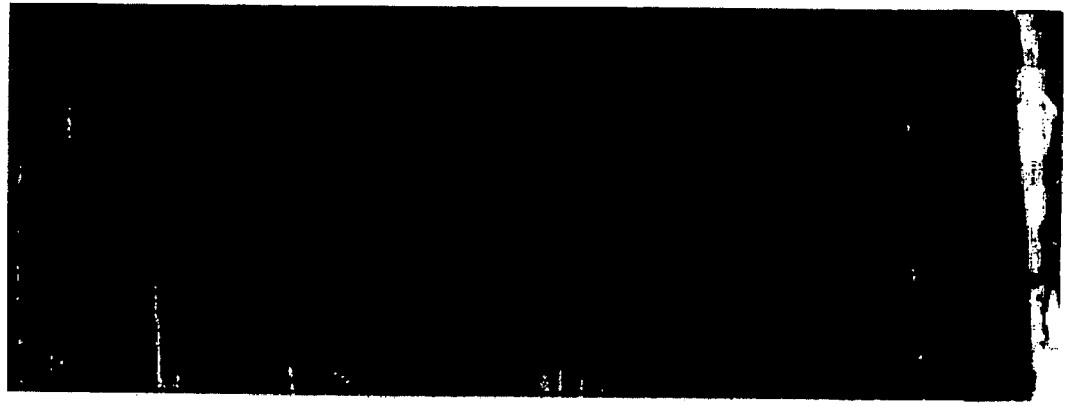
FIG. 4A is an image with multiple dominant orientations.

In some cases, there may be more than one dominant orientation. Such is the case in the image in FIG. 4A. Certain lines are oriented at about 2.5° with respect to the horizontal axis while others are oriented at about 0°. To extract the best quality signature possible, two separate masks are applied to the image. FIG. 4B is the image with a first mask applied while FIG. 4C is the image with a second mask applied.

Detecting if more than one main orientation is present in the image can be done in several ways. For example, by computing the histogram of the orientation image (or one of its sub-region), we can estimate the number of main orientations present. We use a simple criteria based on the number and distribution of the histogram's local maximum. If more than one local maximum exist and they are separated by at least 3°, we conclude that each of these local maximum corresponds to one dominant orientation. Alternatively, if more than one main orientation is present in the image and these orientations are different enough, we can use create a mask that permits us to select only the regions in the image that have an orientation within a given tolerance of a given angle to select the regions corresponding to each main orientation. This would permit us to create signatures that are specific to each of these orientations.

Another module is responsible for detecting regions that present lined features. As explained before, only the lined regions should be considered when creating signatures. Note that texture analysis could also be used to detect these regions. The idea is to use an anisotropy measure derived from the structure tensor. For each pixel, the structure tensor G is defined as $$G = g \cdot g^t = \begin{bmatrix} g_x^2 & g_{xy} \\ g_{xy} & g_y^2 \end{bmatrix}$$

Where g is a gaussian smoothed version of the original image and $g_x^2$ is the square of the derivative of g along the X direction, $g_y^2$ is the square of the derivative of g along the Y direction and $g_{xy}$, is the mixed derivative. We note that G is a 2×2 symmetric positive semi definite matrix whose eigen values $\lambda_1 \geq \lambda_2$ are positives.

At every pixel position, we can compute the anisotropy:

$$A = 1 - \lambda_2/\lambda_1$$

from the eigenvalues $\lambda_1$, $\lambda_2$ of G. As $\lambda_2/\lambda_1$, lies in the interval [0, 1], A also lies in the interval [0, 1]. A value of zero for A indicates a perfectly isotropic neighborhood where a value of one indicates a perfectly anisotropic neighborhood. In practice, the value of A is almost always somewhere between 0.1 and 0.9.

Working with hundreds of bullet images, we found that the regions that exhibit an anisotropy greater than 0.7 were really lined regions and that regions where the anisotropy was less than 0.4 were almost entirely featureless regions not worth using for signature generation. This observation leads to the following automatic Region Of Interest (ROI) definition based on the anisotropy measure: 1) Compute the three different components of the structure tensor (partial derivatives of the Gaussian smoothed original image); 2) Create an anisotropy image where each pixel is given the anisotropy value A computed from the orientation tensor G; 3) Create an anisotropy mask from the anisotropy image where pixels whose value is greater than a given threshold (for example, 0.7) are set to 1 and the other to 0. This mask could be used independently or in combination with orientation masks created by the first module.

Figure 5:
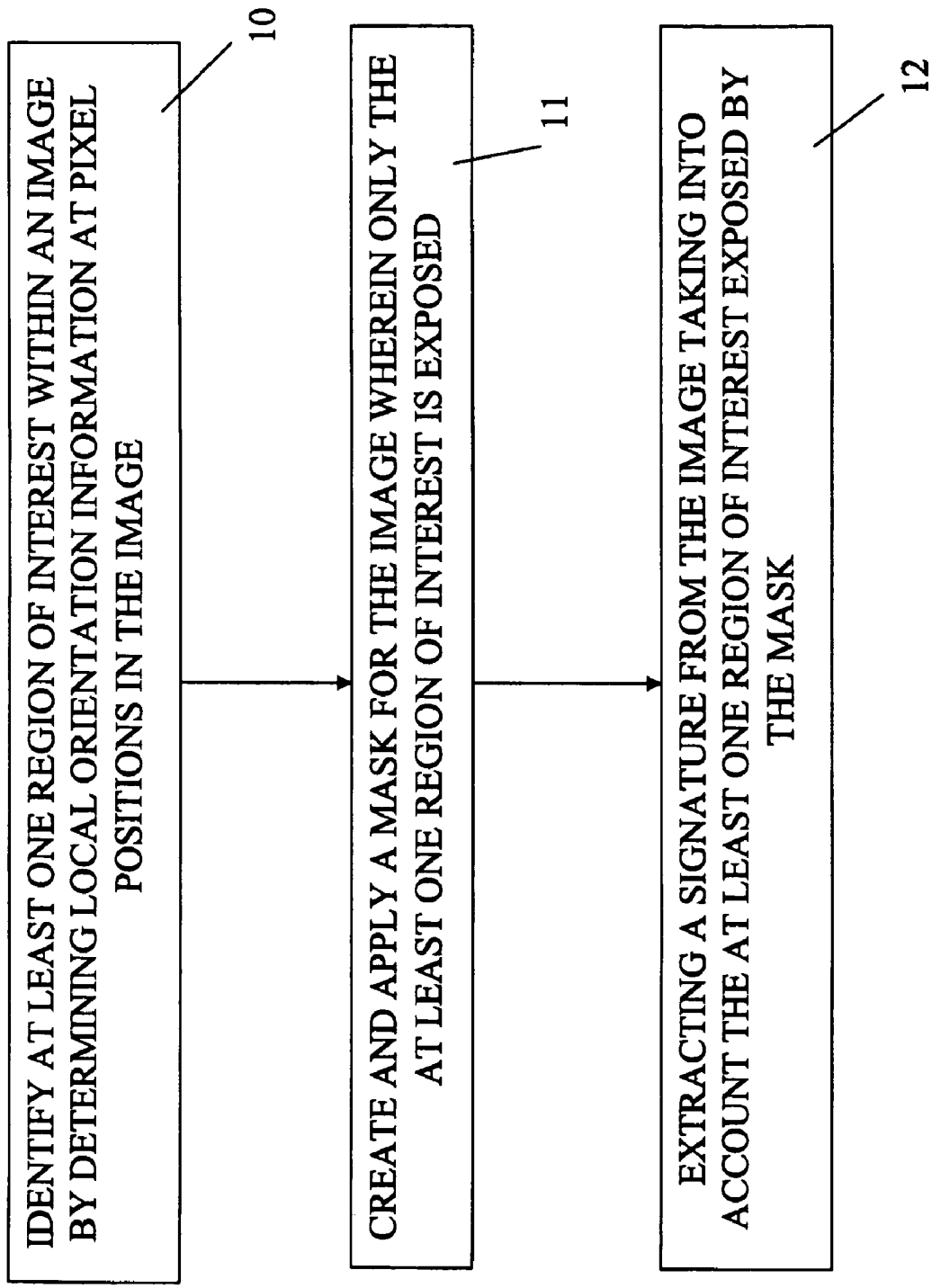
FIG. 5 is a flow chart of the method of the present invention.

FIG. 5 describes the method used in the present invention. The first step consists in identifying at least one region of interest within the image by determining local orientation information comprising elements useful for the specific identification purposes 10. In the preferred embodiment, the elements are characteristic lines and the characteristic lines are striation marks on a bullet or a bullet casing. The pixel positions are assigned an orientation angle. The second step comprises creating and applying a mask for the image wherein only the identified regions of interest are exposed 11. If the orientation angle is above a predetermined threshold, the value of the pixel is set to zero. The predetermined threshold can be entered by a user. It can also be an angle calculated by the system as a function of the predominant angle. The third step comprises extracting a signature for the image by taking into account the regions of interest that were left exposed by the mask and disregarding the regions that were blocked from the image.

Figure 6:
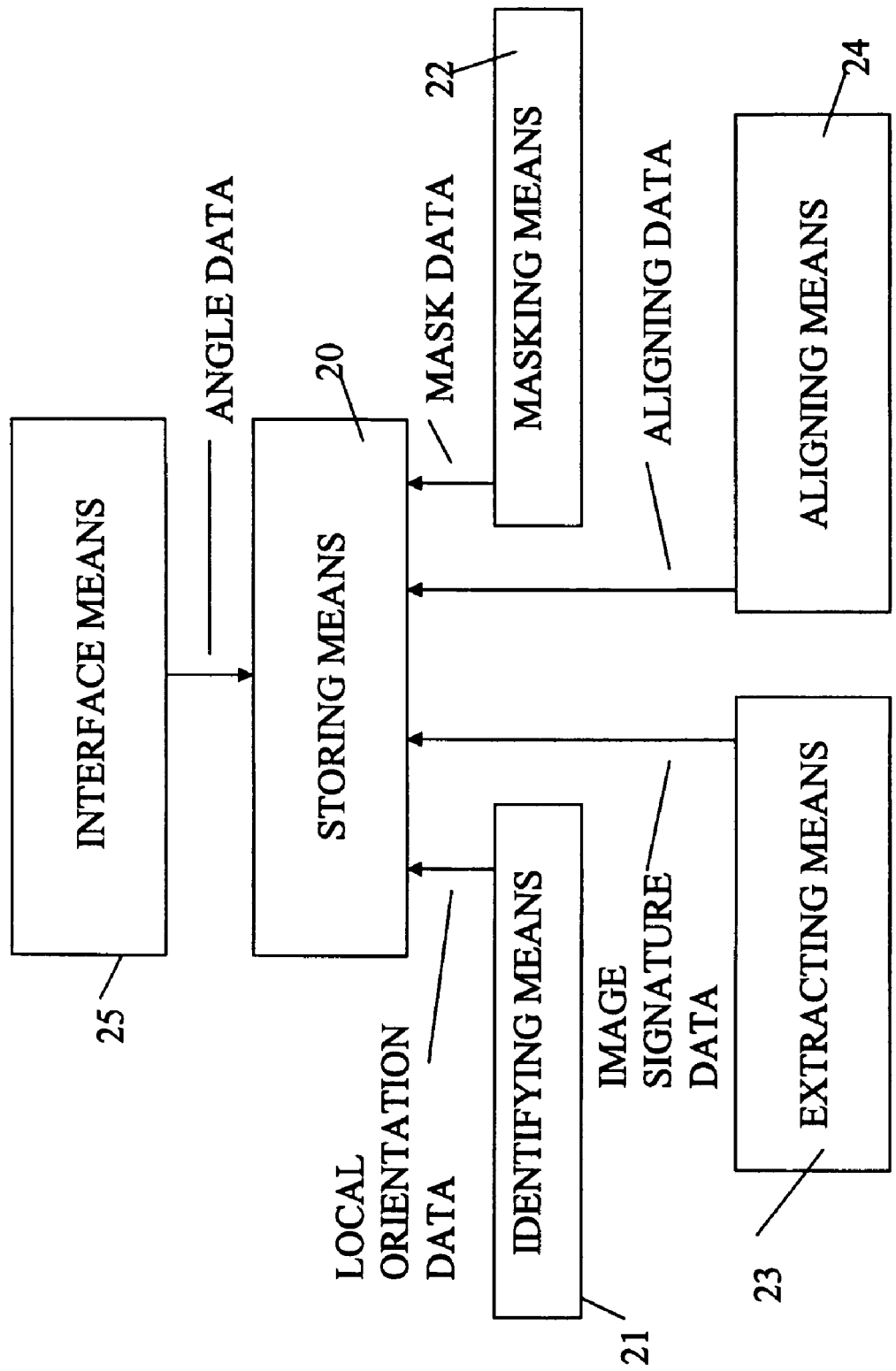
FIG. 6 is an embodiment of the apparatus of the present invention.

FIG. 6 is a preferred embodiment for the apparatus of the present invention. Storing means 20 are used to store an image. Identifying means 21 are for identifying at least one region of interest within the image by determining local orientation information at pixel positions in the image, the region of interest comprising elements useful for the specific identification purposes. For example, the elements can be characteristic lines which are striation marks from a bullet or a bullet casing. Local orientation data is sent from the identifying means 21 to the storing means 20. Masking means 22 are then used to create and apply a mask for the image, wherein only the region of interest is exposed. The mask data is sent from the masking means 22 to the storing means 20. Extracting means 23 are used to extract a signature for the image, taking into account the region of interest exposed by the mask. The image signature data is sent from the extracting means 23 to the storing means 20.

Aligning means 24 may also be present in the apparatus to align horizontally the elements that are present in the region of interest, transferring aligning data from the aligning means 24 to the storing means 20. Interface means are also used for a user to enter a value for a predetermined threshold angle and the angle data is transferred to the storing means 20.

The identifying means 21 may further comprise means for assigning an orientation angle at each pixel position in the image, means for separating the image into a plurality of vertical bands, wherein the vertical bands are based on groupings of similar orientation angles, and means for detecting lined regions within the image. The identifying means may also further comprise computing means for computing three different components of a structure tensor for each pixel in said image, image anisotropy means for creating an anisotropy image wherein each of said pixel is given an anisotropy value computed from said structure tensor, and anisotropy mask means for creating an anisotropy mask from said anisotropy image wherein pixels whose value is greater than a given threshold are set to 1 and pixels whose value is less than a given threshold are set to 0.

The masking means 22 may further comprise means for assigning a value to zero for each pixel position with an orientation angle above a predetermined threshold, means for determining a dominant orientation angle in the image and assigning a value of zero to the pixel positions with an orientation angle with varies from the dominant angle by more than a predetermined threshold, means for creating and applying separate masks for each dominant angle, and means for calculation the predetermined threshold angle as a function of the predominant angle.

The extracting means 23 may also comprise means for extracting a signature for each image having a separate mask applied, in the case where more than one mask is applied for one image.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A method for extracting a high quality signature from an image having areas not relevant for specific identification purposes which can lead to misleading image signatures, the method comprising:
providing an automated system and using said automated system for:
identifying at least one region of interest within said image by determining local orientation information at pixel positions in said image and assigning an orientation angle at each said pixel positions in said image, said at least one region of interest comprising elements useful for said specific identification purposes;
creating and applying a mask for said image by determining a dominant orientation angle in said image and assigning a value of zero to each said pixel positions with an orientation angle which varies from said dominant angle by more than a predetermined threshold, wherein only said at least one region of interest is exposed; and
extracting a signature for said image taking into account said at least one region of interest exposed by said mask.

2. A method as claimed in claim 1, further comprising aligning horizontally said elements present in said at least one region of interest.

3. A method as claimed in claim 1, wherein said creating and applying a mask further comprises assigning a value of zero to each said pixel positions with an orientation angle above a predetermined threshold.

4. A method as claimed in claim 1, wherein said mask is created and applied separately for each dominant orientation angle.

5. A method as claimed in claim 4, wherein said calculating a signature further comprises calculating a signature for each image having a separate mask applied.

6. A method as claimed in claim 1, wherein said elements are characteristic lines.

7. A method as claimed in claim 6, wherein said characteristic lines are striation marks on one of a bullet and a bullet casing.

8. A method as claimed in claim 1, further comprising separating said image into a plurality of vertical bands, wherein identifying a region of interest, creating and applying a mask, aligning horizontally elements, and calculating a signature is done for each of said plurality of vertical bands.

9. A method as claimed in claim 1, further comprising separating said image into a plurality of vertical bands based on groupings of similar orientation angles, wherein identifying a region of interest, creating and applying a mask, aligning horizontally elements, and calculating a signature is done for each of said plurality of vertical bands.

10. A method as claimed in claim 1, wherein said predetermined threshold is an angle entered by a user.

11. A method as claimed in claim 1, wherein said predetermined threshold is an angle calculated as a function of said predominant angle.

12. A method as claimed in claim 1, wherein assigning an orientation angle to each pixel position further comprises using a Hough transform.

13. A method as claimed in claim 1, wherein assigning an orientation angle to each pixel position further comprises using an orientation tensor.

14. A method as claimed in claim 1, wherein said calculating a signature further comprises assigning a one-dimensional signal to said image.

15. A method as claimed in claim 1, wherein said determining a dominant angle further comprises producing a histogram of said image and identifying an angle at which said histogram attains its maximum value as said dominant angle.

16. A method as claimed in claim 15, wherein more than one dominant angle is said to exist if said histogram contains more than one local maximum and said more than one local maximum are separated by at least three degrees.

17. A method as claimed in claim 1, wherein said identifying a region of interest further comprises detecting lined regions within said image.

18. A computer readable memory for storing programmable instructions for use in the execution in a computer of the method of claim 1.

19. A method for extracting a high quality signature from an image having areas not relevant for specific identification purposes which can lead to misleading image signatures, the method comprising:
providing an automated system and using said automated system for:
identifying at least one region of interest within said image by determining local orientation information at pixel positions in said image and detecting lined regions within said image, said at least one region of interest comprising elements useful for said specific identification purposes: wherein said detecting lined regions comprises:
computing three different components of a structure tensor for each pixel in said image;
creating an anisotropy image wherein each of said pixel is given an anisotropy value computed from said structure tensor; and
creating an anisotropy mask from said anisotropy image wherein pixels whose value is greater than a given threshold are set to 1 and pixels whose value is less than a given threshold are set to 0;
creating and applying a mask for said image wherein only said at least one region of interest is exposed; and
extracting a signature for said image taking into account said at least one region of interest exposed by said mask.

20. A method as claimed in claim 19, wherein said anisotropy value lies in the interval [0, 1].

21. A method as claimed in claim 20, wherein said given threshold is 0.7.

22. A method as claimed in claim 19, wherein said three different components are partial derivatives of a Gaussian smoothed version of said image.

23. A method as claimed in claim 19, wherein said structure tensor is a 2×2 symmetric positive semi definite matrix whose eigen values are positive.

24. An apparatus for an automated system to extract a high quality signature from an image having areas not relevant for specific identification purposes which can lead to misleading image signatures, the apparatus comprising:
storing means to store an image;
identifying means for identifying at least one region of interest within said image by determining local orientation information at pixel positions in said image and for assigning an orientation angle at each said pixel positions in said image, said at least one region of interest comprising elements useful for said specific identification purposes;
masking means for creating and applying a mask for said image wherein only said at least one region of interest is exposed, and for determining a dominant orientation angle in said image and assigning a value of zero to each said pixel positions with an orientation angle which varies from said dominant angle by more than a predetermined threshold; and extracting means for extracting a signature for said image taking into account said at least one region of interest exposed by said mask.

25. An apparatus as claimed in claim 24, further comprising aligning means to align horizontally said elements present in said at least one region of interest.

26. An apparatus as claimed in claim 24, wherein said masking means further comprises means for assigning a value of zero to each said pixel positions with an orientation angle above a predetermined threshold.

27. An apparatus as claimed in claim 24, wherein said masking means further comprises means for creating and applying separate masks for each of said dominant orientation angle.

28. An apparatus as claimed in claim 27, wherein said extracting means further comprises means for extracting a signature for each image having a separate mask applied.

29. An apparatus as claimed in claim 24, wherein said identifying means further comprising separating means for separating said image into a plurality of vertical bands.

30. An apparatus as claimed in claim 29, wherein said separating means further comprises means for separating said image into a plurality of vertical bands based on groupings of similar orientation angles.

31. An apparatus as claimed in claim 24, further comprising interface means for a user to enter a value for said predetermined threshold angle.

32. An apparatus as claimed in claim 24, wherein said masking means further comprises calculating means for calculating said predetermined threshold angle as a function of said predominant angle.

33. An apparatus as claimed in claim 24, wherein said identifying means further comprises means for detecting lined regions within said image.

34. An apparatus for an automated system to extract a high quality signature from an image having areas not relevant for specific identification purposes which can lead to misleading image signatures, the apparatus comprising:

storing means to store an image;

identifying means for identifying at least one region of interest within said image by determining local orientation information at pixel positions in said image, said at least one region of interest comprising elements useful for said specific identification purposes; wherein said identifying means further comprises:

computing means for computing three different components of a structure tensor for each pixel in said image;

image anisotropy means for creating an anisotropy image wherein each of said pixel is given an anisotropy value computed from said structure tensor; and anisotropy mask means for creating an anisotropy mask from said anisotropy image wherein pixels whose value is greater than a given threshold are set to 1 and pixels whose value is less than a given threshold are set to 0;

masking means for creating and applying a mask for said image wherein only said at least one region of interest is exposed; and extracting means for extracting a signature for said image taking into account said at least one region of interest exposed by said mask.

* * * * *